United States Patent [19]

Shida

[11] Patent Number: 4,736,253
[45] Date of Patent: Apr. 5, 1988

[54] METHOD AND APPARATUS FOR PRODUCING A HALFTONE DOT BY SELECTIVELY COMPARING IMAGE SIGNALS WITH HIGHLIGHT AND SHADOW REFERENCE VALUES OR WITH HALFTONE DOT SUB-CELL REFERENCE VALUES

[75] Inventor: Junji Shida, Kyoto, Japan

[73] Assignee: Dainippon Screen Mfg. Co., Ltd., Kyoto, Japan

[21] Appl. No.: 649,723

[22] Filed: Sep. 12, 1984

[30] Foreign Application Priority Data

Oct. 28, 1983 [JP] Japan ................. 58-203418

[51] Int. Cl.$^4$ ................................ H04N 1/40
[52] U.S. Cl. ................. 358/283; 358/280; 358/298
[58] Field of Search ............. 358/283, 75, 280, 298

[56] References Cited

U.S. PATENT DOCUMENTS

| | | | |
|---|---|---|---|
| 4,051,536 | 9/1977 | Roetling | 358/298 |
| 4,196,453 | 4/1980 | Warren | 358/298 |
| 4,342,051 | 7/1982 | Suzuki et al. | 358/283 |
| 4,578,713 | 3/1986 | Tsao et al. | 358/283 |

FOREIGN PATENT DOCUMENTS 114133 10/1976 Japan .
146582 11/1980 Japan .

*Primary Examiner*—James J. Groody
*Assistant Examiner*—Randall S. Svihla
*Attorney, Agent, or Firm*—Lowe, Price, LeBlanc, Becker & Shur

[57] ABSTRACT

A predetermined number of sections of an original corresponding to a predetermined number of halftone dot sub-cells are scanned to generate an image signal for each section. If the image signal for a given section is greater than a highlight level reference value (Hi), the corresponding halftone dot sub-cell is made one of two colors, black or white. If the image signal for the given section is less than a shadow level reference value (S), the corresponding halftone dot sub-cell is made the other of the two colors, white or black. If the image signal for the given section falls between the highlight and shadow level reference values, it is compared with a value (Y) representing the average density of the predetermined number of sections of the original to determine whether the corresponding halftone dot sub-cell should be made black or white. When a binary density image is to be reproduced, the highlight and shadow level reference values are selected to be so close together that none of the image signals falls between them. In another embodiment which improves the fidelity of the reproduced image, the number of halftone dot sub-cells which are determined to be the one of the two colors, black or white, by comparing the image signals with corresponding halftone dot sub-cell reference values is made to be equal to the number of halftone dot sub-cells which are determined to be the one of the two colors, black or white, by comparing each of the image signals with the average density value (Y). When an original contains picture, text, and line images and completely black and white areas, appropriate values of (Hi) and (S) and appropriate values of reproduction process control signals (a) and (b) are stored in a memory and read out as a scanning head scans the corresponding areas on the original.

8 Claims, 10 Drawing Sheets

ORIGINAL

REPRODUCTION

REPRODUCTION

REPRODUCTION

IMPROVEMENT OVER FIG.3(b)

IMPROVEMENT OVER FIG.3(b)

IMPROVEMENT OVER FIG.3(c)

IMPROVEMENT OVER FIG.3(d)

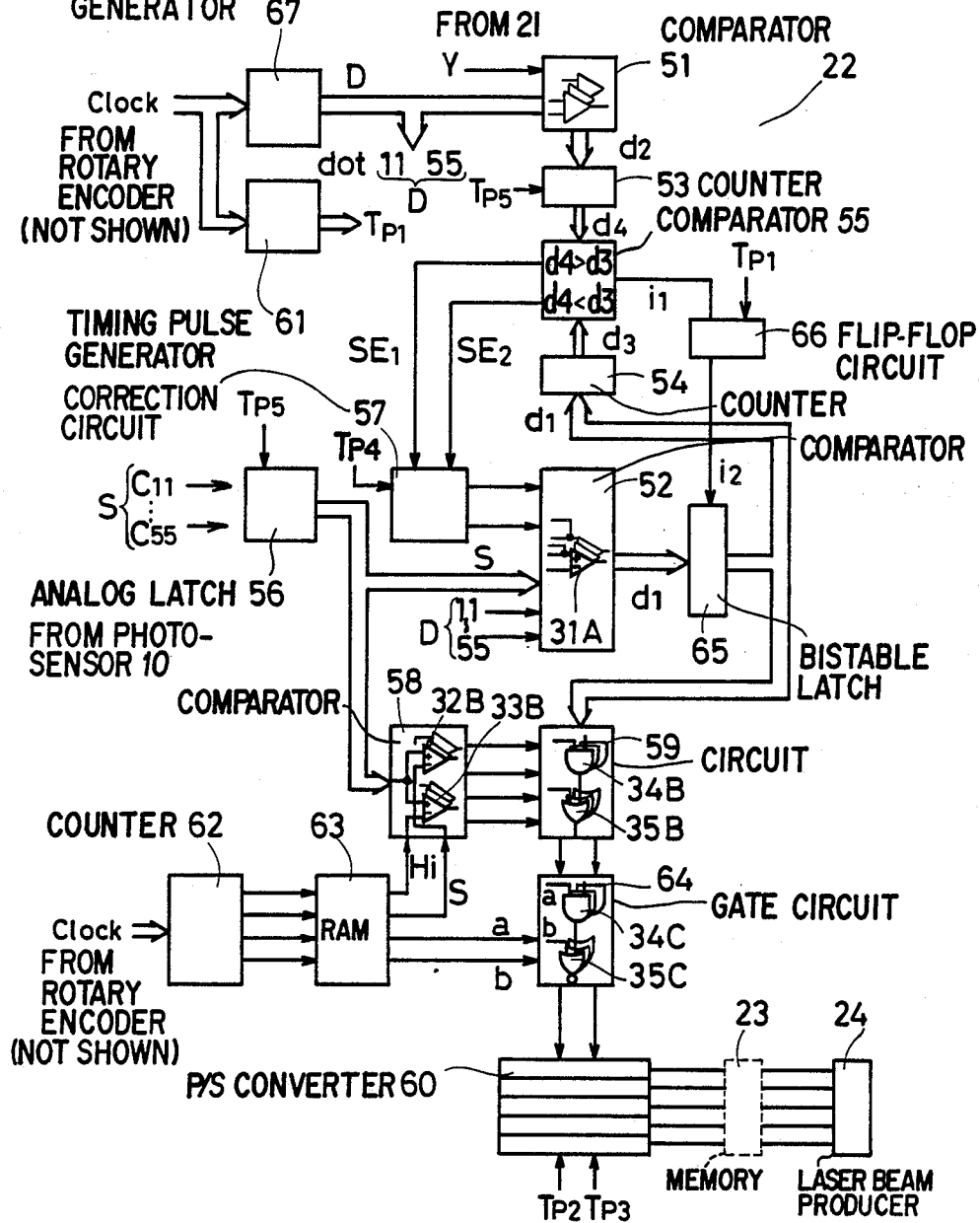

(A)

(B)

(C)

(D)

METHOD AND APPARATUS FOR PRODUCING A HALFTONE DOT BY SELECTIVELY COMPARING IMAGE SIGNALS WITH HIGHLIGHT AND SHADOW REFERENCE VALUES OR WITH HALFTONE DOT SUB-CELL REFERENCE VALUES

FIELD OF THE INVENTION

This invention relates to an apparatus for producing a halftone dot in reproducing images, particularly to such an apparatus in which a signal for recording a halftone dot is obtained by comparing a voltage corresponding to the density value of a section of an original corresponding to a halftone sub-cell area composing the halftone dot with the voltage of a reference signal such as a halftone sub-cell reference signal.

BACKGROUND OF THE INVENTION

A mechanical halftone screen comprises a plurality of pinholes (there are several types of pinholes such as square type or chain type) arranged in matrix. A halftone dot generator of an electronic image reproducing system has a function of electronically generating halftone dots being equivalent to said mechanical halftone screen.

FIG. 1 shows an electronically-generated halftone dot. Precisely, one halftone dot corresponding to an area (W×L) is composed of a plurality of halftone dot elements $\omega_1 l_1$ to $\omega_{20} l_{20}$ (each halftone dot element is called a "halftone sub-cell"). The halftone sub-cell is blackened when the density value of the corresponding section of an original is more than a fixed density value indicated as a number in each of the smallest squares of FIG. 1. Each of the circumferential halftone sub-cells is given a higher threshold density level, while each of the central halftone sub-cells is given a lower density threshold level.

By the way, FIG. 1 shows only the threshold levels of density of the halftone sub-cells situated in one quarter of the halftone dot because the density distribution is symmetrical about axes A, B and C in the other quarters.

FIG. 2 shows a graph of the density distribution of the quarter area shown in FIG. 1, in which the longitudinal axis represents the halftone dot percentage (%), the lateral axis represents the number of the column ($\omega$) and the parameter represents the number of the row (l). As is obvious from FIGS. 1 and 2, only the central area of a halftone dot is blackened when the density of corresponding area of the original is comparatively lower, while a greater part of a halftone dot is blackened when the density of corresponding area of the original is comparatively higher. In other words, the density of a portion of an original can be expressed by the occupation rate of the blackened area to the whole area of a halftone dot.

Basically, the density value of an area of an image can be expressed by the corresponding voltage within a certain range (for example, for 0 V to 6 V). To realize that, an image reproducing system sets up an upper limit (called a "highlight level" hereinafter) and a lower limit (called a "shadow level" hereinafter); whereby a halftone sub-cell corresponding to an area of an image of which voltage level is equal to or higher than the highlight level is recorded in 0% halftone dot density (hereinafter, this state is identified as one wherein the halftone sub-cell is whitened), while a halftone sub-cell corresponding to an area of the image of which the voltage level is equal to or lower than the shadow level is recorded in 100% halftone dot density (hereinafter, this state is referred to as one wherein the halftone sub-cell is blackened).

In this case, when the density value of one division of the original, which is submitted to a color computation process, is used for recording each of one-sixteenth areas I, II, III . . . XVI corresponds to 55% halftone dot density, the halftone dot is actually recorded as shown as a hatched area in FIG. 1.

FIGS. 3(b), (c) and (d) show reproduction images of an original shown in FIG. 3(a) recorded according to the density distribution pattern of FIG. 1. In FIGS. 3(b), (c) and (d), the areas identified by I, II, III . . . XVI of each reproduction image correspond to the areas identified by the same signs in FIG. 1. These areas are recorded according to the density distribution pattern of FIG. 1 by using the density values obtained from areas i, ii, iii . . . vii of FIG. 3(a) respectively. It is now assumed that the original A of FIG. 3(a) is a binary density image (consisting of a white portion of 0% halftone dot density and a black (hatched) portion of 100% halftone dot density), and the average density values of the areas i, ii and iii correspond to halftone dot density values of 21%, 55% and 85% respectively. Because the area I is whitened under a condition in which the density of the corresponding area of the original is less than 56% halftone dot density, all the halftone sub-cells thereof are whitened by the signal from the area I having 21% halftone dot density value.

Because the area II includes halftone sub-cells which are to be blackened when the density of the corresponding area of the original has more than 20% halftone dot density, about half of the halftone sub-cells thereof are blackened by the signal of 55% halftone dot density. Similarly, because the area III has the same density distribution as that of the area II, all the halftone sub-cells are blackened by the signal of 85% halftone dot density. Consequently, the reproduction image of FIG. 3(b) is obtained. In this case, the areas I and II take shapes that are quite different from the corresponding areas i and ii of the original.

Then, assuming that the hatched area of the original A has 50% halftone dot density value, the areas i, ii and iii have halftone dot density values of 10.5%, 27.5% and 42.5% respectively. Consequently, the reproduction image of FIG. 3(c) is obtained, wherein areas I and II are different from the corresponding areas i and ii of the original.

Further assuming that the hatched area of the original A has 80% halftone dot density, and the lower density area has 25% halftone dot density value, the areas i, ii and iii have halftone dot density values of 36.55%, 55.25% and 71.75% respectively while each of areas v, vi and vii has halftone dot density of 25%. Consequently, the reproduction image of FIG. 3(d) is obtained, which image is different from the original.

To resolve the above problem, the pickup area (one division) of which density signal is to be submitted to a color computation process at a time should be smaller. However, the reduction of the pickup area results in prolongation of the color computation time.

Although the color computation time can be reduced by outputting the density signals from a plurality of pickup areas at a time, however, it requires as many color computation units as that of the pickup areas to embody the above method because each of the computation units is capable of processing the density signal of one pickup area at a time.

Japanese Kokai No. 55-146582 discloses the method as shown in FIG. 14. When an image of a division 103 composed of a plurality of sections (for example 4×4 sections) arranged in matrix is reproduced, at first several dot patterns 101 are prepared beforehand as shown in FIG. 14(b). The area of each of the dot patterns 101 corresponds to that of one division 103 shown in FIG. 14(a), while each of the dot patterns 101 corresponds to a pixel of a certain density range. Then a reproduction image is recorded as in the following way.

For example, when the density value of a section $P_{22}$ of the division 103 is $(5/16) \times 100\%$, a dot pattern 5 corresponding to the density is selected. Then the signal of the corresponding square $P'_{22}$ is output to record the corresponding halftone sub-cell $P''_{22}$ of a photosensitive material. Meanwhile, when a section $P_{14}$ (having a density value of $(7/16) \times 100\%$) is to be recorded, the corresponding halftone sub-cell $P''_{14}$ is recorded by using the dot signal of the corresponding square $P'_{14}$ of a dot pattern 7.

Therefore, in this method, a certain number of dot patterns must be prepared for density variation of the divisions of an original. In addition, the method has a drawback that even the density of a section is high enough, the corresponding halftone sub-cell is not blackened except for a case when the corresponding halftone dot pattern has a blackening dot at the corresponding place.

Japanese Kokai No. 51-114133 discloses a method as shown in FIG. 15. At first, a signal (A) of the density value of each section of an original (shown in FIG. 15(a)) is added to a signal (B) of corresponding halftone sub-cell reference value (shown in FIG. 15(b)) to obtain a signal (C) (shown in FIG. 15(c)). Then by comparing the signal of (C) with a signal (E) of a threshold value (in this case, (E)=19.5) a signal (D) is obtained, expressed by a combination of values "1" (when (C)>(E)) and "0" (when (C)<(E)). This signal is used for controlling a recording beam.

The above method aims to prevent a moire pattern from appearing onto a reproduction image, therefore, the object of the method is different from that of this invention.

SUMMARY OF THE INVENTION

This invention is proposed to resolve the aforementioned conventional problems.

An object of this invention is to increase the resolution of boundary portions of an image to be reproduced.

In order to attain the above object, this invention provides an apparatus in which an area of an original, that is, a division, is made to comprise a certain number of sections integrally corresponding to the number of the sub-cells composing one halftone dot area, thereby a halftone dot is recorded by comparing the voltage level of the density signal of each of the sections with that of a fixed reference voltage. In the above, the division corresponds to an area of the original of which density signal is processed at a time by a color computation device of an image reproducing system.

In the first embodiment of this invention, a voltage corresponding to the density value of a section is compared with a pre-determined upper limit voltage, i.e., a highlight level voltage and a lower limit voltage, i.e., a shadow level voltage of a halftone sub-cell reference signal. In the second embodiment of this invention, the voltage corresponding to the density value of a section is compared with the highlight level voltage, the shadow level voltage and the voltage of the sub-cell reference signal itself.

In both embodiments, for example, when a positive reproduction image is to be recorded by using the density signal of a positive original, the density signal of a section which has a corresponding voltage higher than the highlight level voltage causes the corresponding halftone sub-cell to be whitened (not blackened), while the density signal of a section which has a corresponding voltage lower than the shadow level voltage causes the corresponding halftone sub-cell to be blackened. Meanwhile, the density signal of a section which has a corresponding voltage in between the highlight level voltage and the shadow level voltage causes the corresponding halftone sub-cell to be recorded according to a conventional halftone dot producing method, that is, a method in which a halftone dot is produced by comparing the voltage corresponding to the density signal of a division with the voltage of a sub-cell reference signal.

The first embodiment is capable of producing an image of high resolution when the voltage corresponding to the density value of a section is higher than the highlight level voltage or lower than the shadow level voltage. However, the first embodiment is capable of reproducing no higher quality image than can be reproduced by a conventional method.

In comparison to the above first embodiment, in the second embodiment, a voltage corresponding to the density value of a section between the highlight level voltage and the shadow level voltage can be compared with the voltage of the halftone sub-cell reference signal in order to blacken or whiten the corresponding halftone sub-cell. In this embodiment, the number of the blackened (whitened) sub-cells is made to be equal to that obtained by comparing the voltage corresponding to the density signal of the same section with the shadow (highlight) level signal.

The above and other objects and features of this invention can be appreciated more fully from the following detailed description when read with reference to the acompanying drawings.

BRIEF DESCRIPTION OF THE DRAWINGS

FIGS. 8(a)–(b), 8(c) show images of the original as shown in FIG. 3(a), reproduced by the first embodiment of the present invention and corresponding respectively to the images reproduced by the prior art as shown in FIGS. 3(b) and 3(c), while

FIG. 9 shows another embodiment of the system of this invention.

PREFERRED EMBODIMENT OF THE INVENTION

Figure 4:
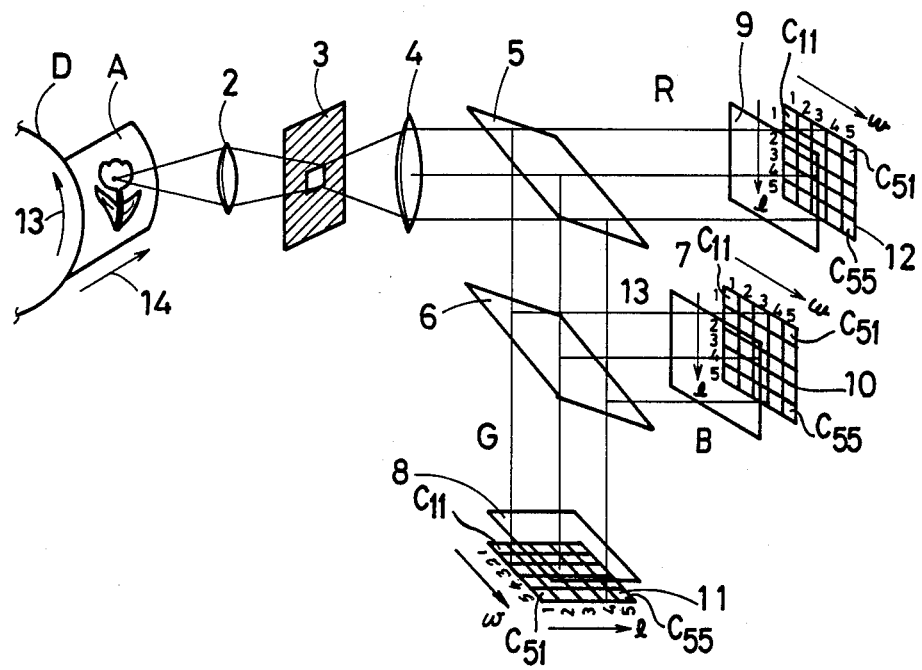
FIG. 4 shows an input device of the system of this invention.

FIG. 4 shows an optical system for obtaining a density (image) signal of each of the sections of an original. A beam transmitted from or reflected at an original A mounted on an input drum and scanned in main (13) and subscanning (14) directions is refracted by a pickup lens 2 to be brought to an aperture 3 which adjusts the pickup area. Furthermore, the beam is brought via a lens 4, half mirrors 5 and 6 and B, G and R color filters 7, 8 and 9 to photo-sensors 10, 11 and 12.

Figure 3A:
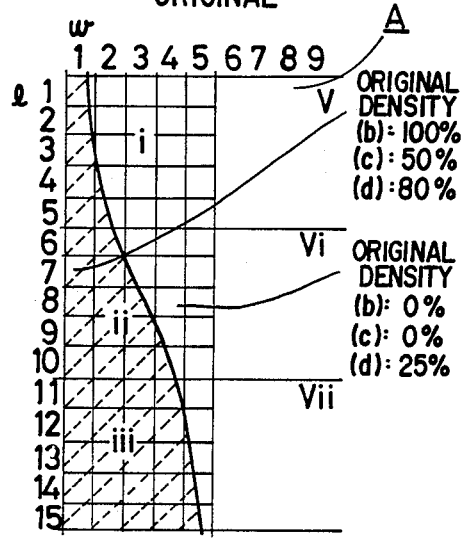
FIG. 3(a) shows an original.
Figure 3B:
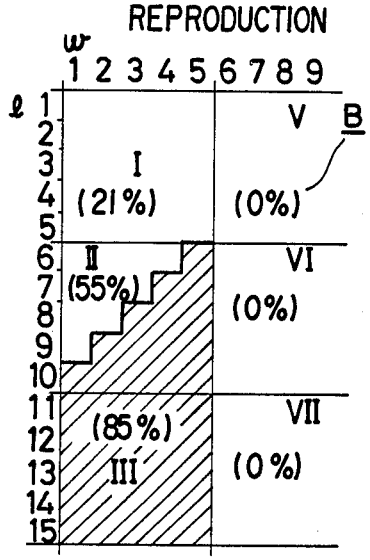
FIGS. 3(b)–(d) show images thereof reproduced by the prior art when the hatched and non-hatched portions of the original represent densities corresponding respectively to 100% and 0%, 50% and 0%, and 80% and 25% of halftone dot percentage respectively.

The photo-sensors can be a two-dimensional CCD (Charged Coupled Device) photo-sensor or the same wherein the sensory area corresponds to each of Areas i, ii ... of the original A as shown in FIG. 3(a) as well as to each of Areas I, II ... of the reproduction image B as shown in FIG. 3(b). The lenses 2 and 4 are adjusted in order to make the pickup area and the sampling area of the photo-sensor have a relation of a desired magnification ratio M between each other of both the main and the sub-scanning direction factors. This kind of adjustment work can be carried out by varying the sampling area of the photo-sensor.

The elements $C_{11}$ to $C_{55}$ of the CCD photo-sensor correspond to the halftone sub-cells $\omega_1 l_1$ to $\omega_5 l_5$ as well as to sections $\omega_1 l_1$ to $\omega_5 l_5$ of an original. Purporting to the photo-sensor, a color CCD photo-sensor comprising a color filter composed of three elements for component colors R, G and B arranged in matrix can be used.

Of course the sampling process can be performed by using a mono-dimensional CCD photo-sensor in combination with line memories. Yet, a conventional method for sampling the image signal of each section one by one can also be adopted.

Figure 5:
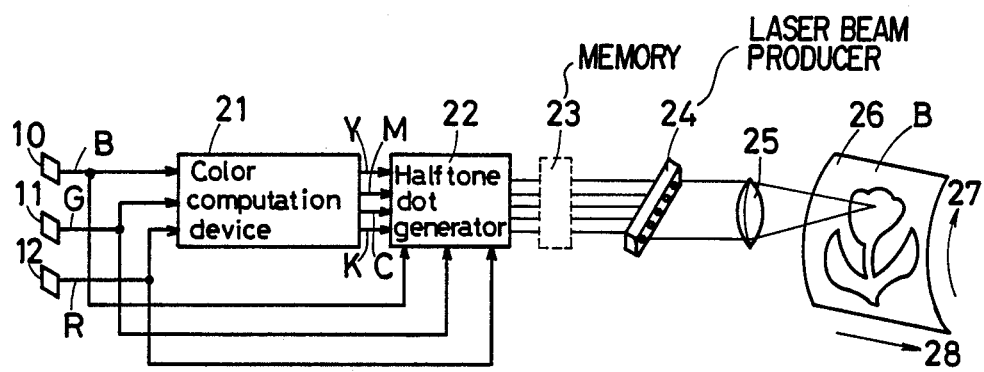
FIG. 5 shows a conventional halftone dot generator.

FIG. 5 shows an apparatus of this invention for producing a halftone dot by using thus obtained density signal of a section of an original. The density signal of a section is amplified to have a certain amplitude and input to a halftone dot generator 22 (via an analog latch at need). The halftone dot generator 22 generates a halftone dot signal by comparing the voltage corresponding to the density value of each section to a halftone sub-cell reference voltage as mentioned afterwards. Meanwhile, the density signal of the section is input to a color computation device 21, which carries out a color computation process on the density signal obtained by averaging the sum of the density values from the sensor elements of the photo-sensor 10 (11, 12) of which sensory area corresponds to a plurality of sections (in this case, 25 sections (=one division)), and outputs a resultant of color separation signals Y (Yellow), M (Magenta), C (Cyan) and K (Black) to said halftone dot generator 22.

The halftone dot signal obtained in the halftone dot generator 22 is once stored into a memory 23 and then input to, for example, a laser beam producer 24, which exposes a photosensitive material 26 being scanned in main (27) and subscanning (28) directions according to the halftone dot signal by means of a laser beam via a laser beam lens 25.

The memory 23 is ordinarily used in any scanners for the purpose of continuously varying the magnification ratio between the input side and the output side, however, no detailed explanation is prepared for the device here because it is not the main factor of this invention.

Figure 6:
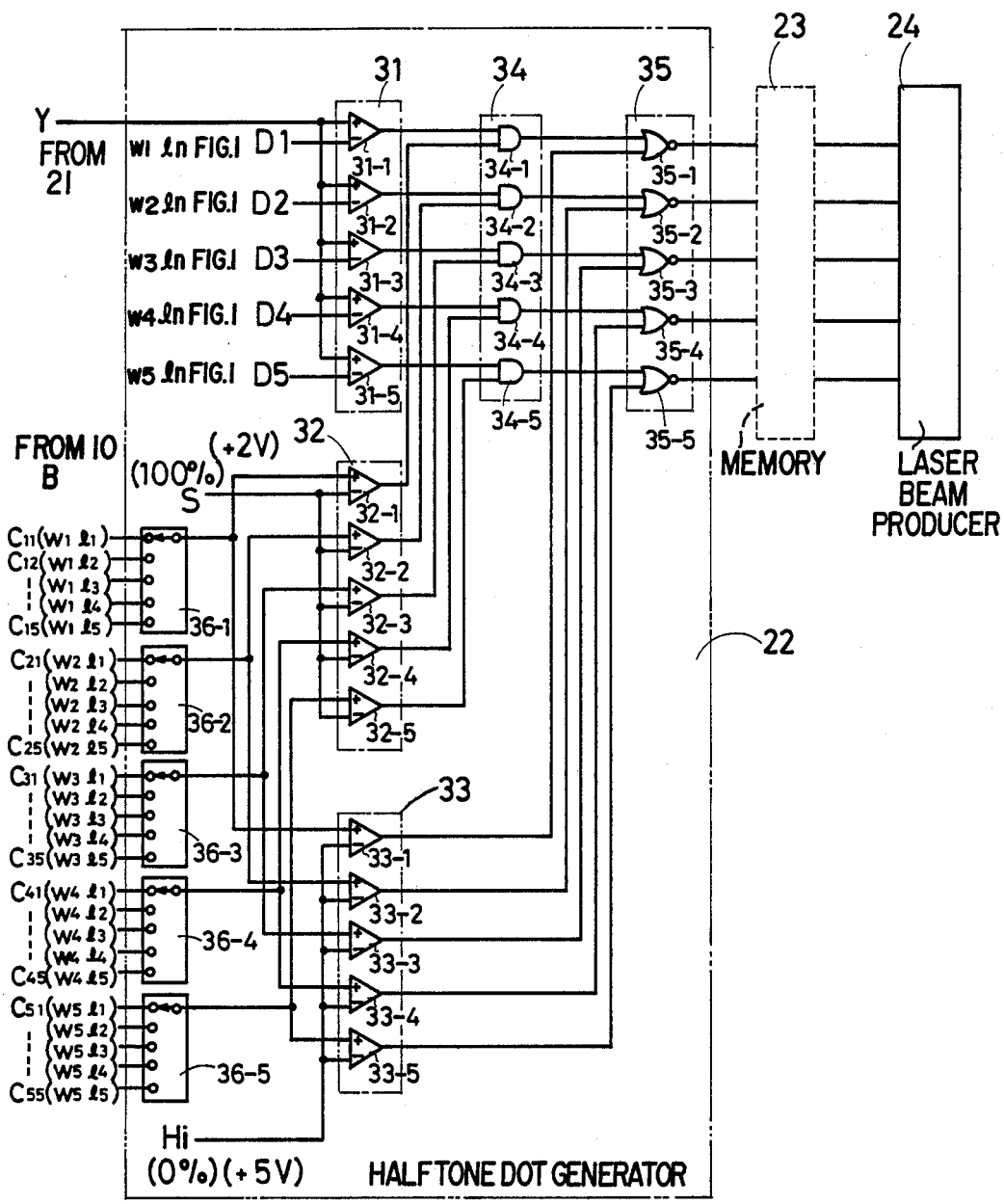
FIG. 6 shows an embodiment of the system of this invention.

FIG. 6 shows an embodiment of the halftone dot generator 22, wherein a circuit for one of the separation colors of Y, M, C and K represents the other three (not indicated). The following explanation is based on the circuit for reproducing Y color separation image. Since the color component signal B corresponds to the color separation image Y, the signal from each of the elements $C_{11}$ to $C_{55}$ of the photo-sensor 10 for B color component is input directly to the halftone dot generator 22 as the yellow density signal of the corresponding section. The signal is amplified and controlled of its input timing by means of a latch at need.

The density signals from the sensor elements $C_{11}$ to $C_{15}$ are input to a selector switch $36_{-1}$. Likewise, the density signals from the sensor elements $C_{21}$ to $C_{25}$, $C_{31}$ to $C_{35}$, $C_{41}$ to $C_{45}$ and $C_{51}$ to $C_{55}$ are input to selector switches $36_{-2}$, $36_{-3}$, $36_{-4}$ and $36_{-5}$ respectively. The selector switch $36_{-1}$ selects the signals in order of the signals from $C_{11}$, $C_{12}$, $C_{13}$, $C_{14}$ to $C_{15}$. Likewise, the selector switches $36_{-2}$, $36_{-3}$, $36_{-4}$ and $36_{-5}$ selects the signals in the same manner.

The output signals of the selector switches $36_{-1}$ to $36_{-5}$ are input to the positive terminals of comparators $32_{-1}$ to $32_{-5}$ as well as to the positive terminals of the comparators $33_{-1}$ to $33_{-5}$ respectively. On the other hand, a highlight level voltage signal (Hi) (+5 V corresponding to 0% halftone dot density value) is input to the negative terminals of the comparators $33_{-1}$ to $33_{-5}$, while a shadow level voltage signal (S) (+2 V corresponding to 100% halftone dot density value) is input to the negative terminals of the comparators $32_{-1}$ to $32_{-5}$.

As is obvious from FIG. 6, each of the comparators 31, 32 and 33, an AND-gate 34 and a NOR-gate 35 comprises individually operating five units, however, the following only describes the first units of each circuit in order to give a simple explanation of their functions. When a voltage corresponding to the density value from the sensor element $C_{11}$ ($C_{12}$, $C_{13}$, $C_{14}$ or $C_{15}$) is higher than that of the highlight level voltage (for example, when the former is the voltage of +6 V), the comparator $33_{-1}$ outputs "H" (High level) signal to a NOR-gate $35_{-1}$. Therefore the NOR-gate $35_{-1}$ outputs "L" (Low level) signal regardless of the output of an AND-gate $34_{-1}$. This condition is called "Ⓑ condition", which means that a signal for whitening the corresponding halftone sub-cell (in other words, the corresponding halftone sub-cell is not blackened by this signal) is output.

When a voltage corresponding to the density value from the sensor element $C_{11}$ ($C_{12}$, $C_{13}$, $C_{14}$ or $C_{15}$) is lower than that of the shadow level voltage (for example, when the former is the voltage of +1 V), the comparator $32_{-1}$ outputs "L" signal to the AND-gage $34_{-1}$. Therefore the AND-gate $34_{-1}$ outputs "L" signal regardless of the output of a comparator $31_{-1}$ (mentioned afterwards) to one terminal of the NOR-gate $35_{-1}$. While "L" signal is input from the comparator $33_{-1}$ to the other terminal of the NOR-gate $35_{-1}$ because the input voltage is lower than the shadow level voltage, so the NOR-gate $35_{-1}$ outputs "H" signal. This condition is called " Ⓒ condition", which means that a signal for blackening the corresponding halftone sub-cell is output.

Figure 1:
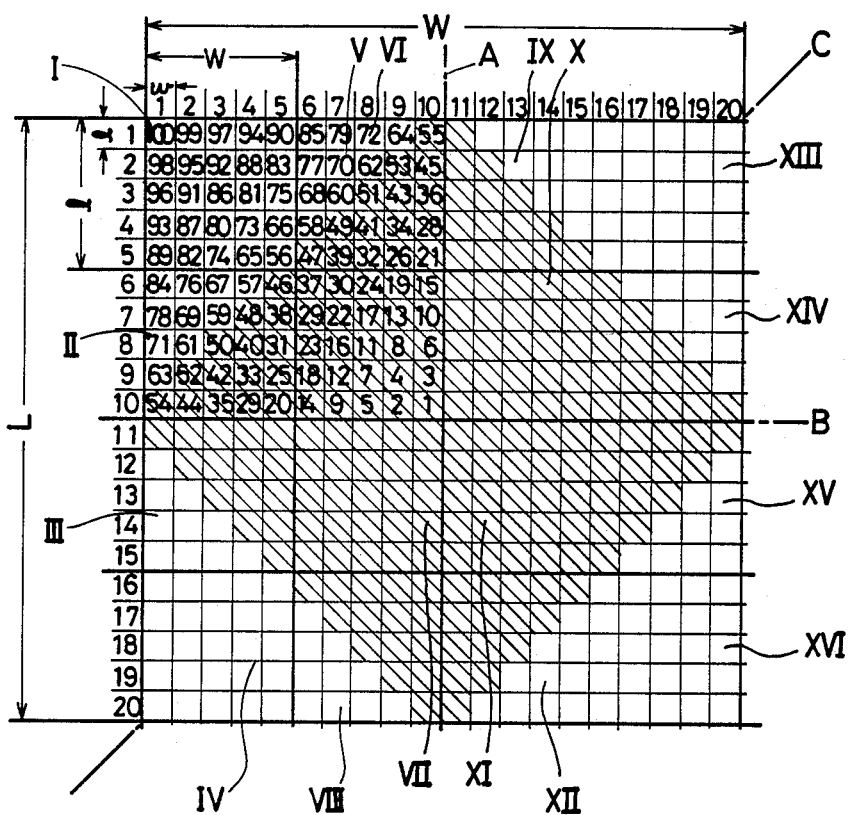
FIG. 1 shows a halftone dot sub-cell density distribution pattern.
Figure 2:
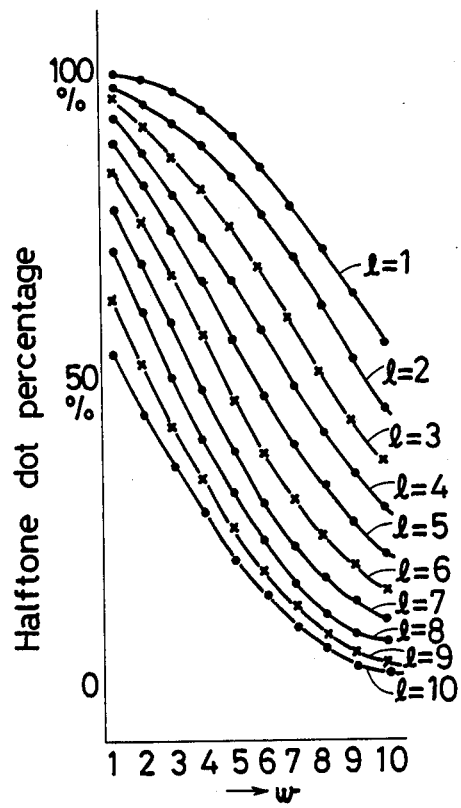
FIG. 2 shows a graph of the density distribution shown in FIG. 1.

When a voltage corresponding to the density value from the sensor element $C_{11}$ ($C_{12}$, $C_{13}$, $C_{14}$ or $C_{15}$) is in between the highlight and the shadow level voltages (for example a signal of 50% density value represented by the voltage of 3.5 V), the halftone dot generator 22 operates as follows. A density signal Y obtained by averaging the density values from the sensor elements $C_{11}$ to $C_{55}$ via the color computation device 21 is input to the positive terminal of the comparator $31_{-1}$, while halftone dot sub-cell reference signals for the halftone dot sub-cells $\omega_1 l_1 - \omega_1 l_5$, $\omega_2 l_1 - \omega_2 l_5$, $\omega_3 l_1 - \omega_3 l_5$, $\omega_4 l_1 - \omega_4 l_5$ and $\omega_5 l_1 - \omega_5 l_5$ as shown in FIG. 1 are successively input to the negative terminals $D_1 - D_5$ of comparators $31_{-1} - 31_{-5}$ respectively. Therefore, when the voltage of the density signal Y is higher than that of the corresponding halftone sub-cell reference signal D1, the comparator $31_{-1}$ outputs "H" signal to the AND-gate $34_{-1}$. When the former is lower than the latter, the comparator $31_{-1}$ outputs "L" signal to the AND-gate $34_{-1}$. On the other hand, the comparator $32_{-1}$ outputs "H" signal to the AND-gate $34_{-1}$, while the comparator $33_{-1}$ outputs "L" signal to the NOR-gate 35-1. Therefore, when the comparator $31_{-1}$ outputs "H" signal, the NOR-gate outputs "L" signal. When the comparator $31_{-1}$ outputs "L" signal, the NOR-gate outputs "H" signal. This condition is called " Ⓐ condition", which means that "H" signal blackens the corresponding halftone sub-cell while "L" signal whiten the corresponding halftone sub-cell (in other words, the corresponding area of a photosensitive material is blackened or whitened).

Figure 7:
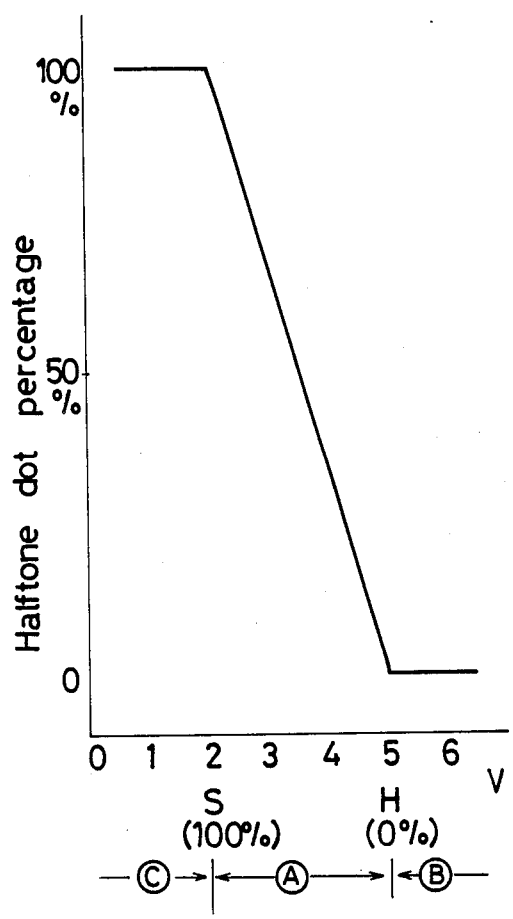
FIG. 7 shows the characteristic of the output of the embodiment shown in FIG. 6.

FIG. 7 shows a relation between the density value (voltage level) of the original and the halftone dot percentage of a reproduction image when a positive reproduction image is obtained from a positive original.

The embodiment of FIG. 6 is a circuit for obtaining a positive original, therefore, in order to produce a negative reproduction image from a positive original, OR-gate units must be substituted for the NOR-gate units $35_{-1}$, $35_{-2}$, $35_{-3}$, $35_{-4}$ and $35_{-5}$.

The image of the original A shown in FIG. 3(a) is reproduced by means of the halftone dot generator shown in FIG. 6 under the condition indicated in FIG. 7 as in the following way.

Figure 8A:
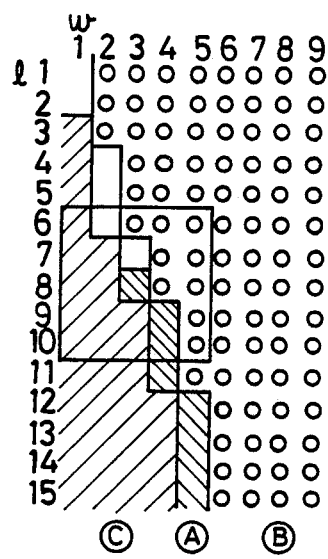

FIG. 8(a) is a reproduction image of the original A shown in FIG. 3(a) obtained by using the circuit of FIG. 6 under a condition in which the shadow level voltage is +2 V while the highlight level voltage is +5 V. Assuming that the voltages corresponding to the density values of the sections $\omega_1 l_1$ and $\omega_1 l_2$ of original A as shown in FIG. 3(a) are in between the highlight and the shadow level voltages (for example, when they are +2.2 V and +2.1 V respectively), the halftone dot generator 22 operates in Ⓐ condition. Meanwhile, to the negative terminal of the comparator $31_{-1}$, the halftone dot sub-cell reference signals having voltage +2 V and +2.06 V corresponding to the densities 100% and 98% of the halftone dot sub-cells $\omega_1 l_1$ and $\omega_1 l_2$ are input successively. On the other hand, to the positive terminal of the comparator $31_{-1}$, the density signal Y of voltage +4.37 V (21% halftone dot density) of the corresponding division i of the original A is input. Therefore, the comparator $31_{-1}$ outputs an "H" signal in response to each of said halftone sub-cell reference signals. Consequently, the NOR-gate 35-1 outputs "L" signals successively to whiten the halftone sub-cells $\omega_1 l_1$ and $\omega_1 l_2$, as shown in FIG. 8(a).

The halftone sub-cells $\omega_1 l_3$ to $\omega_1 l_5$, as shown in FIG. 8(a), are blackened because the voltage of each of the corresponding sections $\omega_1 l_3$ to $\omega_1 l_5$ of the original A as shown in FIG. 3(a) is less than 2 V (that is, the halftone generator 22 operates in Ⓒ condition).

Inasmuch as the voltage corresponding to the density value of each of the sections $\omega_1 l_8$ and $\omega_2 l_8$ as shown in FIG. 3(a) is less than the shadow level voltage +2 V (the halftone dot generator operates in Ⓒ condition), the corresponding halftone sub-cells $\omega_1 l_8$ and $\omega_2 l_8$ are blackened, as shown in FIG. 8(a). Voltage corresponding to the density value of a section $\omega_3 l_8$ shown in FIG. 3(a) is now in between the highlight level voltage and the shadow level voltage (the halftone dot generator 22 operates in Ⓐ condition). In this, a signal of voltage +3.35 V corresponding to 55% halftone dot density of the section $\omega_3 l_8$ shown in FIG. 3(a) is input to the positive terminal of the comparator $31_{-3}$, and, as shown in FIG. 1, is compared with the voltage +3.5 V corresponding to 50% halftone dot density being input to the negative terminal of the comparator $31_{-3}$. Thus, the comparator 31-3 outputs "L" signal to blacken the halftone sub-cell $\omega_3 l_8$ as shown in FIG. 8(a). Inasmuch as the voltage corresponding to each of the sections $\omega_4 l_8$ and $\omega_5 l_8$ is more than the highlight level voltage as shown in FIG. 3(a), the corresponding halftone sub-cells $\omega_4 l_8$ and $\omega_5 l_8$ are not blackened, as shown in FIG. 8(a).

Figure 8B:
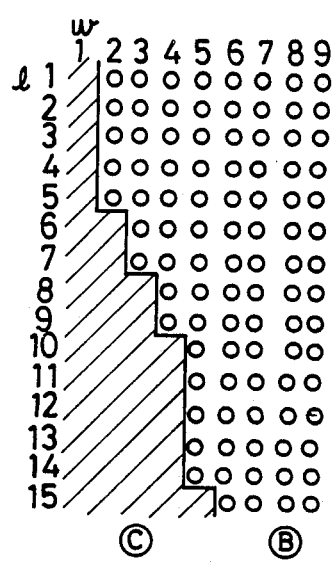

Thus, the reproduced image as shown in FIG. 8(a) by means of this invention achieves, as shown in FIG. 3(a) more fidelity to the original than the reproduction image shown in FIG. 3(b) recorded by means of a conventional method. The proportion of the black area to the white area depends on the range of Ⓐ condition in this case. When a binary density image must be reproduced faithfully, the shadow and the highlight level voltages had better, for example, be +3.47 V and +3.5 V which correspond to 51% and 50% halftone dot density values respectively. In this case, the output signals of the comparators $31_{-1}$ to $31_{-5}$ are hardly affected by the halftone sub-cell reference signals, consequently a reproduction image faithful to the original A as shown in FIG. 8(b) can be obtained.

Figure 8C:
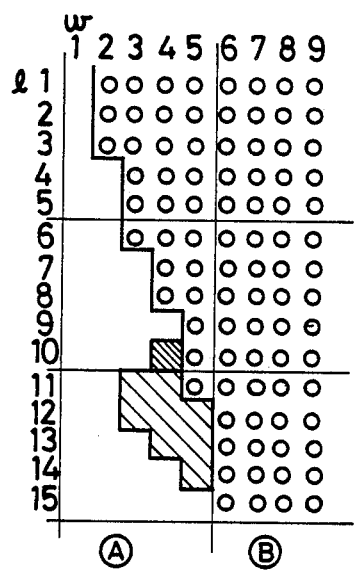

In comparison to the above-mentioned reproduction images of FIGS. 8(a) and (b) composed of solid and white areas, FIG. 8(c) shows a reproduction image of the original A composed of 50% halftone dot density areas and white portions. In FIG. 3(a), the hatched area corresponding to voltage +3.5 V is recorded in Ⓐ condition. Because the areas i, ii and iii have halftone dot density values of 10.5%, 27.5% and 42.5% respectively, the reproduction image of FIG. 8(c) is obtained as a result. The reproduction image of FIG. 8(c) is slightly superior to that of FIG. 3(c) in terms of expressing the border line of the vacant area and the 50% halftone dot percent area. By the way, a color image is expressed by using four separation inks Y, M, C and K, therefore, they always compensate for each other in forming the border line of the image.

Figure 3C:
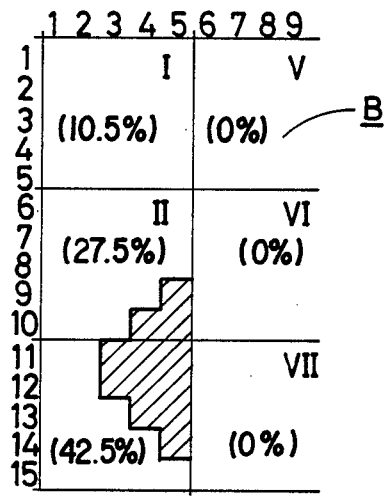
Figure 3D:
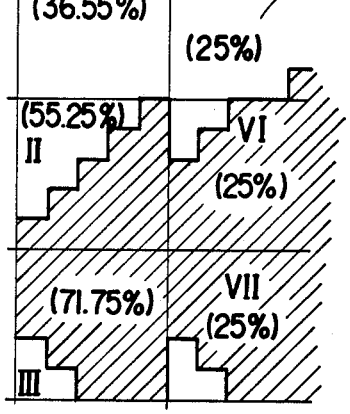

When the hatched area of the original A has 80% halftone dot density value (+2.75 V) and the low-density area thereof has 25% halftone dot density value (+4.25 V), the original A is reproduced in Ⓐ condition as well as in a conventional way to be a reproduction image of FIG. 3(d) (not shown in FIG. 8).

By comparing the reproduction images of FIGS. 3, (b) and (c) with the reproduction images of FIGS. 8(a), (b) and (c), the following observation can be obtained.

That is, when the original is composed of areas of 0% density and areas of 100% density (binary density image), the method of this invention is capable of producing high-fidelity reproduction images as shown in FIGS. 8(a) and (b).

However, the number of the blackened sub-cells of the areas II or III of the image of FIG. 8(c) is different from that of the image of FIG. 3(c). Precisely, the area II of FIG. 8(c) comprises one blackened sub-cell as against three of FIG. 3(c), while the area III of FIG. 8(c) comprises eight blackened sub-cells as against nine of FIG. 3(c). Generally, the reproduction images of FIG. 3 are superior to that of FIG. 8 in terms of their fidelity to the originals. That is because the reproduction image of FIG. 8 are recorded without using the color computation device.

FIG. 9 shows another embodiment of this invention, which carries out an object of recording a reproduction image of higher fidelity to its original when the voltage of a signal from each of the sensor elements $C_{11}$ to $C_{55}$ is in between the highlight level voltage (Hi) and the shadow level voltage (S) (i.e. Ⓐ condition).

Figure 12:
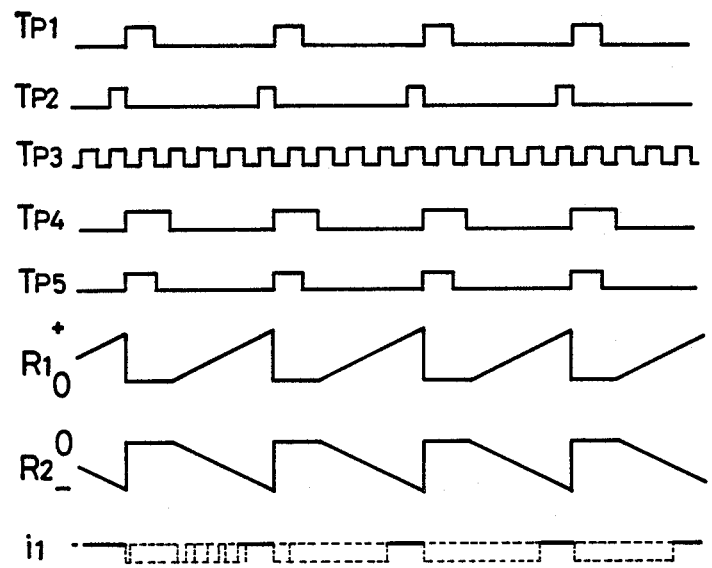
FIG. 12 shows a timing chart of the system shown in FIG. 9.

FIG. 12 shows a timing chart of the circuit of FIG. 9, in which timing pulses $T_{P1}$ to $T_{P5}$ are generated by a timing pulse generator 61 using clock pulses obtained from rotary encoders connected to input and output drum motors of an image reproducing system.

A halftone sub-cell reference signal generator 67 outputs a halftone sub-cell reference signal D to a comparator 51. The comparator 51 comprises twenty-five comparator units $31_{A\text{-}11}$–$31_{A\text{-}55}$. Each unit of the comparator compares the voltage of the corresponding reference signal with that of a signal output from an image processor (in this case, Y color signal of a division). Each of the comparator units outputs to a counter 53 a state signal $d_2$ which becomes "H" when the voltage of the signal Y is equal to or higher than that of the corresponding reference signal, or becomes "L" when the former is lower than the latter. The counter 53 counts the number of "L" signal contained in the state signal $d_2$ and outputs the number as a signal $d_4$ to a comparator 55 (mentioned afterwards).

In the meantime, the density signals S from the sensor elements $C_{11}$ to $C_{55}$ of the CCD photo-sensor 10 are latched in an analog latch 56 in synchronism with the timing pulse $T_{P5}$, and input to a comparator 52. The comparator 52 comprises twenty-five comparator units, each of which compares the voltage of one corresponding signal out of the signals from the sensor elements $C_{11}$ to $C_{55}$ with that of the corresponding reference signal D. Each of the comparator units outputs a state signal $d_1$, which becomes "H" when the voltage of the density signal is higher than that of the corresponding reference signal D, or becomes "L" when the former is lower than the latter.

Incidentally, in the embodiment of FIG. 9, a positive reproduction image of a positive original is obtained, that is, each halftone sub-cell is blackened by "H" signal output from a gate circuit 64 (mentioned later) when the output of the comparator 52 is "L".

The state signal $d_1$ is input via a bistable latch 65 being controlled by a control signal $i_2$ (mentioned afterwards) to a counter 54. The counter 54 counts the number of "L" signal component and output the resultant value $d_3$ to the comparator 55, which compares the count value $d_3$ with the count value $d_4$. When $d_4 > d_3$, the comparator 55 outputs a selection signal $SE_1$ of "H" from its > terminal to a correction circuit 57. When $d_4 < d_3$, the comparator 55 outputs a selection signal $SE_2$ of "H" from its < terminal to the correction circuit 57. The correction circuit 57 carries out a correction process on the density signals from the sensor elements $C_{11}$ to $C_{55}$ in order to make the value $d_4$ agree with the value $d_3$. When $d_4 = d_3$, the comparator 55 outputs a coincidence signal $i_1$ of "H" to a flip-flop circuit 66, which outputs the control signal $i_2$ of "L" to the bistable latch 65. The bistable latch 65 holds the state signal $d_1$ under the condition when $d_3 = d_4$ until the timing pulse $T_{P1}$ is input to the flip-flop circuit 66.

Thus corrected state signal $d_1$ is input to a P/S converter 60 via gate circuits 59 and 64 (mentioned afterwards) in synchronism with the timing pulse $T_{P2}$. The P/S converter 60 outputs density signals from one column of the sensor elements (For example, $C_{11}$ to $C_{15}$) one by one in due order to a memory 23 in synchronism with the timing pulse $T_{P3}$.

Figure 10:
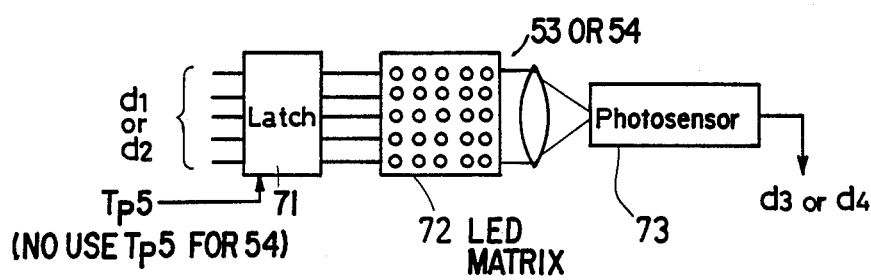
FIG. 10 shows a device for counting the number of halftone sub-cells.

FIG. 10 shows an embodiment of the counter 53. The state signal $d_2$ is latched in a latch 71 synchronizing with the timing pulse $T_{P5}$ and then input to an LED matrix 72 which has as many LED units as the sensor elements. A certain number of the LED units to which "L" signals are input corresponding to the value of the state signal $d_2$ (the number of the halftone sub-cells to be blackened) emit light. The quantity of the lights are detected and converted into said value signal $d_4$ by a photo-sensor 73 to be output to the comparator 55.

The counter 54 has the same structure as that of the counter 53, however, a latch corresponding to the latch 71 is not provided because the density signals from the sensor elements are input to the latch 56 in synchronism with the timing pulse $T_{P5}$.

Figure 11:
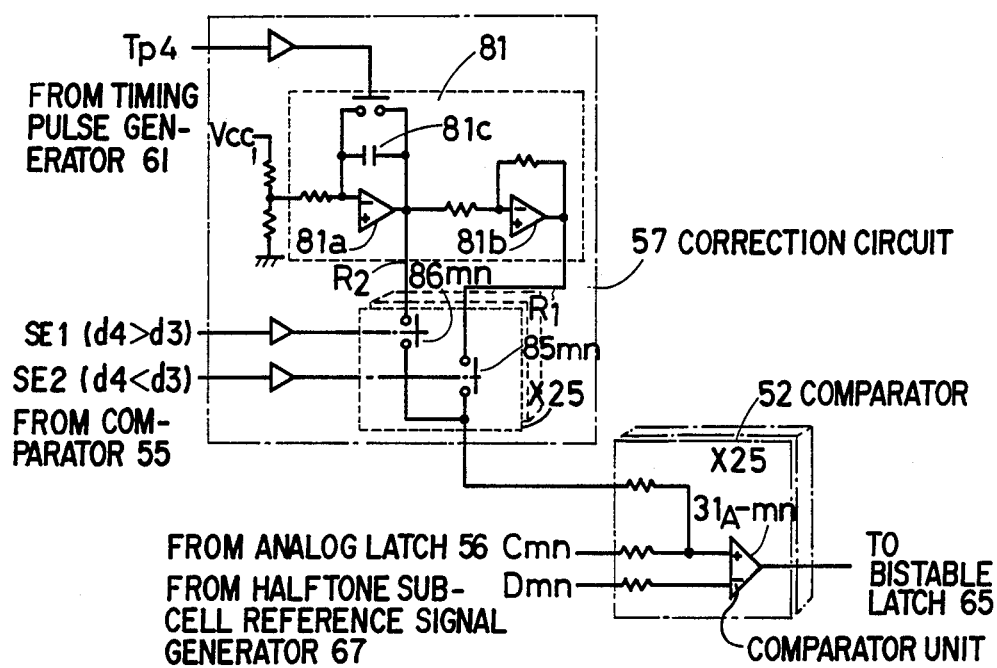
FIG. 11 shows a device for correcting the number of blackened halftone sub-cells.

FIG. 11 shows the detail of said correction circuit 57. The negative input terminal and the output terminal of an amplifier are short-circuited while the timing pulse $T_{P4}$ is "H". When the timing pulse $T_{P4}$ becomes "L", a capacitor $81_c$ begins to be charged, consequently the amplifier $81_a$ outputs a correction signal $R_2$ having a forward-declining saw-tooth waveform as shown in FIG. 12.

Meanwhile, an amplifier $81_b$ outputs a correction signal $R_1$ having a forward-uprising saw-tooth waveform as shown in FIG. 12. Then the voltage of either of the correction signals $R_1$ or $R_2$ is added to each of the density signals from the sensor elements $C_{11}$ to $C_{55}$ to be input to the positive terminals of the corresponding comparator units $31_{A\text{-}mn}$ respectively.

Precisely, when $d_4 > d_3$, the selection signal $SE_1$ of "H" is output from > terminal of the comparator 55, which signal closes a switch $86_{mn}$ to reduce the voltage applied to the positive terminal of each of the comparator units until the value $d_3$ (the number of the comparator units of which outputs are "L") comes up to the value $d_4$.

When $d_4 < d_3$, the selection signal $SE_2$ of "H" is output from < terminal of the comparator 55, which signal closes a switch $85_{mn}$ to increase the voltage applied to the positive terminal of each of the comparator units until the value $d_3$ (the number of the comparator units of which outputs are "L") comes down to the value $d_4$.

In this, the number of the switches $85_{mn}$ ($86_{mn}$) is the same as the comparator units.

Figure 13:
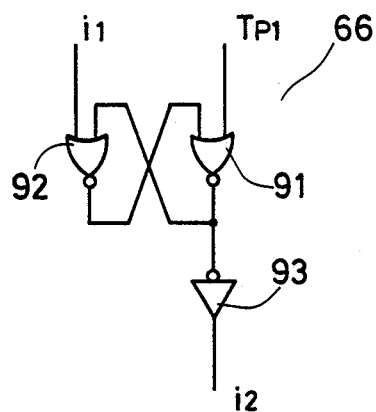
FIG. 13 shows a flip-flop circuit used in the embodiment shown in FIG. 9.
Figure 14A:
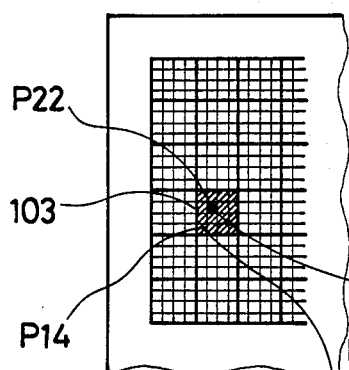
FIGS. 14(a)–14(c) show a conventional method of recording halftone sub-cells.
Figure 14B:
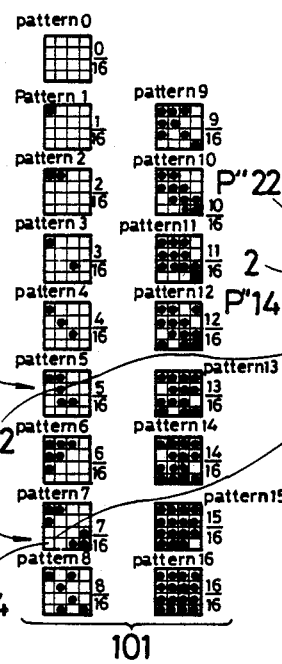
Figure 14C:
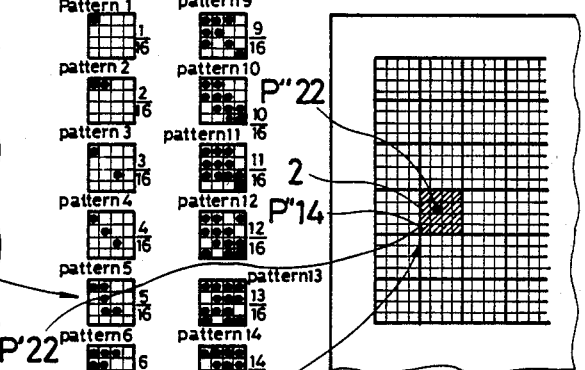
Figure 15A:
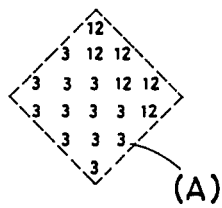
FIGS. 15(a)–15(d) show a conventional method of recording halftone sub-cells for preventing the phenomnon of moiré from taking place onto a reproduction image.
Figure 15B:
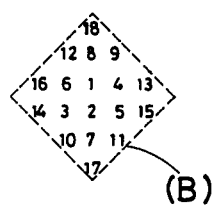
Figure 15C:
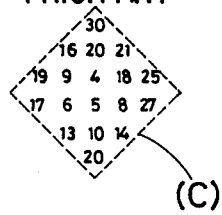
Figure 15D:
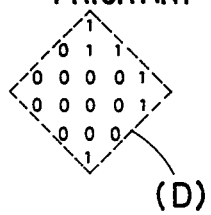

FIG. 13 shows the detail of the flip-flop circuit 66. The flip-flop circuit 66, composed of two NOR-gates 91 and 92 and a NOT-gate 93 behind the NOR-gate 91, outputs the control signal $i_2$ of "H" when the timing pulse $T_{P1}$ is input thereto or outputs the control signal $i_2$ of "L" when the coincidence signal $i_1$ is input thereto. Therefore, the density signals from the sensor elements $C_{11}$ to $C_{55}$ held in the latch 56 according to the timing pulse $T_{P5}$ are latched in the latch 65 as a corrected state signal $d_1$ in conformity with the control signal $i_2$ which changes from "H" to "L" the moment a correction process is completed. Then the control signal $i_2$ becomes "H" again synchronizing with the timing pulse $T_{P1}$ after when the state signal $d_1$ is input to a P/S converter in accordance with the timing pulse $T_{P2}$.

In FIG. 3(a), when the higher density area has 80% halftone dot density and the lower density area has 25% halftone dot density, in other words, when the density signals from the sensor elements $C_{11}$ to $C_{55}$ are in between the highlight level and the shadow level, the corrected state signal $d_1$ is obtained as in the following way.

When the original of FIG. 3(a) is under the above-mentioned condition, the output signal (the condition signal $d_2$) of the comparator 51 corresponds to the density distribution shown in FIG. 3(d). Meanwhile, the output signal (the uncorrected condition signal $d_1$) of the comparator 52 corresponds to the density distribution shown in FIG. 8(d).

Precisely, the sections of higher density area are blackened when the halftone sub-cell reference signals correspond to more than 80% halftone dot density, while the sections of lower density area are blackened when the halftone sub-cell reference signals correspond to less than 25% halftone dot density. Meanwhile, the sections which lie on the boundary between both the areas are blackened when the voltage corresponding to the average density of each of the sections are more than that of the corresponding halftone sub-cell reference signal.

Figure 8D:
FIG. 8(d) shows the image reproduced by the second embodiment of the present invention and corresponding to the image as shown in FIG. 3(d).

In the area II of FIG. 3(d), fifteen sections are blackened, while in the area II of FIG. 8(d), fourteen sections are blackened by comparison. Accordingly, the comparator 55 outputs the selection signal $SE_1$ of "H" from its > terminal, which signal closes the switch $86_{mn}$ to reduce the voltage levels corresponding to the density signals from the sensor elements $C_{11}$ to $C_{55}$. So the comparator unit having an output voltage which is closest to the input level thereof (in this case, the unit $31_{A-12}$) out of all the comparator units $31_{A-mn}$ becomes "L" to blacken the corresponding halftone sub-cell (in this case, the sub-cell $\omega_1 l_7$). Synchronizing with the blackening of the sub-cell $\omega_1 l_7$, the comparator 55 outputs the coincidence signal $i_1$ from its = terminal. Then the flip-flop circuit outputs the control signal $i_2$ of "L" to the bistable latch 65 to hold the corrected condition signal $d_1$.

Since the correction signal $R_2$ is a gradually increasing voltage signal, the halftone sub-cells are blackened in order of $\omega_1 l_7 \rightarrow \omega_1 l_6 \rightarrow \omega_2 l_6 \rightarrow \omega_2 l_8$. Similarly, since the correction signal $R_1$ is a gradually decreasing voltage signal, the halftone sub-cells are whitened in order of $\omega_5 l_9 \rightarrow \omega_4 l_9 \rightarrow \omega_3 l_8 \rightarrow \omega_5 l_{10}$.

In the embodiment of FIG. 9, a comparator 58 comprises twenty-five comparator units $32_{B-11}$ to $32_{B-55}$, each of which receives the voltage signal from the corresponding sensor element at its positive terminal as well as the shadow level signal (S) at its negative terminal. Each of the comparator units $32_{B-11}$ to $32_{B-55}$ has the same function as each unit of the comparator 32 of FIG. 6. The comparator 58 comprises another twenty-five comparator units $33_{B-11}$ to $33_{B-55}$, each of which receives the voltage signal from the corresponding sensor element at its positive terminal as well as the highlight signal (Hi) at its negative terminal. Each of the comparator units $33_{B-11}$ to $33_{B-55}$ has the same function as that of each unit of the comparator 33 of FIG. 6.

A gate-circuit 59 has twenty-five AND-gate units $34_{B-11}$ to $34_{B-55}$ corresponding to each unit of the AND-gate 34 of FIG. 6, and twenty five OR-gate units $35_{B-11}$ to $35_{B-55}$ corresponding to each unit of the NOR-gate 35. The comparator 58 and the gate circuit 59 determine the range of Ⓐ, Ⓑ and Ⓒ operation conditions shown in FIG. 7 according to the highlight level (Hi) and the shadow level (S) being previously set up to a RAM 63 mentioned afterwards. Within Ⓐ operation condition, the bistable latch 65 outputs the image signal.

A gate-circuit 64 comprises twenty-five AND-gate units $34_{C-11}$ to $34_{C-55}$ corresponding to each unit of the AND-gate 34 of FIG. 6, and twenty-five NOR-gate units $35_{C-11}$ to $35_{C-55}$ corresponding to each unit of the NOR-gate 35 of FIG. 6.

By the way, recording conditions for each of the color separation images can be controlled by inputting output condition selection signals ⓐ and ⓑ to the AND-gate units $35_{C-11}$ to $35_{C-55}$ respectively. When the selection signal ⓐ is "H" and the selection signal ⓑ is "L", the present color separation film is recorded by the output signal of the gate circuit 59. When the selection signal ⓑ is "H", the present color separation film is recorded with white halftone sub-cells. When the selection signal ⓐ is "L" and the selection signal ⓑ is "L", the present color separation film is recorded with black halftone sub-cells.

The above explanation is based on a condition in which a positive reproduction image is recorded by using the image signal of a positive original. So when a negative reproduction image must be recorded by using the image signal of a positive original, said NOR-gate units $35_{C-11}$ to $35_{C-55}$ must be replaced by OR-gate units.

A counter 62 produces a signal for designating the present scanning position by using output pulses from rotary encoders (not shown), and then outputs the signal to a RAM 63. The RAM 63 is previously provided with data of the highlight level voltage (Hi), shadow level voltage (S) and the selection signals ⓐ and ⓑ corresponding to the portions of an original. The signals of (Hi), (S), ⓐ and ⓑ can take appropriate values for controlling the reproduction state of each color separation image and each area thereof. Practically, the signals ⓐ and ⓑ can be "H" or "L", while the signal (Hi) or (S) is able to take an arbitrary voltage within a certain range (for example, 2 V to 5 V).

When a drawing image such as a literal image or a linear design image must be reproduced, the signals (Hi) and (S) must take closest voltages, for example +3.5 V and +3.49 V respectively. In this, color separation films to be recorded can be designated by the signals a and ⓑ.

Besides, the system of this invention is capable of reproducing an original recorded by means of halftone dots as a binary density image, and is further capable of reproducing an original of a hairline design with producing no moiré pattern.

By setting up appropriate values for the voltage signals (Hi) and (S) to the RAM 63, an original of a mixture of drawing images and halftone dot images can be reproduced.

By the way, density signal of each of divisions to be input to the color computation device can be detected by a photo-sensor composed of one element.

Although in the aforesaid embodiments, one section corresponds to one halftone sub-cell, any number of sections of the original can correspond to any number of sub-cells on the reproduced image, having ratios which may be, for example, 1:2, 2:1 or 2:3.

As mentioned above, the apparatus of this invention is capable of recording a reproduction image of higher resolution, in addition, it is capable of reproducing a drawing image and a multi-color image independently or together.

I claim:

1. A method of producing a halftone dot comprising a predetermined number of halftone dot sub-cells by making each sub-cell ($\omega_m l_n$) one of two colors, black or white, comprising the steps of:
   (a) obtaining a value ($C_{mn}$) representative of the density of each of a predetermined number of sections of an original corresponding to the predetermined number of halftone dot sub-cells by scanning the original;
   (b-1) making each halftone dot sub-cell ($\omega_m l_n$) one of said two colors, black or white, when the corresponding value ($C_{mn}$) is larger than a first reference value (Hi);
   (b-2) making each halftone dot sub-cell ($\omega_m l_n$) the other of said two colors, white or black, when the corresponding value ($C_{mn}$) is smaller than a second reference value (S);
   (b-3) if a value ($C_{mn}$) is between the first reference value (Hi) and the second reference value (S), determining whether the corresponding halftone dot sub-cell ($\omega_m l_n$) is to be black or white by comparing a value (Y) representative of the average density of said predetermined number of sections of said original with a predetermined reference value for the corresponding sub-cell ($\omega_m l_n$).

2. A method as recited in claim 1 in which the first reference value (Hi) and the second reference value (S) are selected to be so close to each other that none of the values ($C_{mn}$) falls between them so that a binary density image may be faithfully reproduced.

3. A method of producing a halftone dot comprising a predetermined number of halftone dot sub-cells by making each sub-cell ($\omega_m l_n$) one of two colors, black or white, comprising the steps of:
   (a) obtaining a value ($C_{mn}$) representative of the density of each of a predetermined number of sections of an original corresponding to the predetermined number of halftone dot sub-cells by scanning the original;
   (b-1) determining which of the halftone dot sub-cells should be one of said two colors, black or white, by comparing the values ($C_{mn}$) with corresponding predetermined halftone dot sub-cell reference values;
   (b-2) determining which of the halftone dot sub-cells should be said one of said two colors, black or white, by comparing a value (Y) representative of the average density of said predetermined number of sections of said original with each of said halftone dot sub-cell reference values;
   (b-3) comparing numbers (d3) and (d4) of said halftone dot sub-cells which are determined to be said one of said two colors, black or white, in steps (b-1) and (b-2), respectively;
   (b-4) if (d3) is not equal to (d4), determining to be said one of said two colors, black or white, a halftone dot sub-cell determined in step (b-1) to be the other of said two colors, white or black, corresponding to one of said predetermined number of sections of said original having a value ($C_{mn}$) which is closest to its corresponding predetermined halftone dot sub-cell reference value or determining to be the other of said two colors, white or black, a haltone dot sub-cell determined in step (b-1) to be said one of said two colors, black or white, corresponding to one of said predetermined number of sections of said original having a value ($C_{mn}$) which is closest to its corresponding predetermined halftone dot sub-cell reference value until (d3) is equal to (d4);
   (b-5) latching a signal representing the color of each of said halftone dot sub-cells as determined in steps (b-1) to (b-4);
   (c-1) making each halftone dot sub-cell said one of said two colors, black or white, when the corresponding value ($C_{mn}$) is larger than a first reference value (Hi);
   (c-2) making each halftone dot sub-cell the other of said two colors, white or black, when the corresponding value ($C_{mn}$) is smaller than a second reference value (S);
   (c-3) if a value ($C_{mn}$) is between the first reference value (Hi) and the second reference value (S), making the corresponding halftone dot sub-cell one of said two colors, black or white, in accordance with the signal latched in step (b-5).

4. A method as recited in claim 3 in which the first reference value (Hi) and the second reference value (S) are selected to be so close to each other that none of the values ($C_{mn}$) falls between them so that a binary density image may be faithfully reproduced.

5. A method as recited in claim 3, wherein said original contains picture images to be reproduced with halftone dots and binary density images such as text and line images and completely black and white areas, said method further comprising the steps of:
   storing in a random-access memory (RAM) the locations on said original of said picture, text, and line images together with appropriate values of said first and second reference values (Hi) and (S) and appropriate values of first and second signals (a) and (b) for controlling recording of said picture, text, and line images, and storing in said random-access memory (RAM) the locations on said original of said completely black and white areas with appropriate values of said first and second signals (a) and (b) for controlling recording of said completely black and white areas; and
   reading out said appropriate values of said first and second reference values (Hi) and (S) and said appropriate values of said first and second signals (a)

and (b) from said random-access memory (RAM) when a scanning head scanning said original reaches the corresponding locations on said original.

6. An apparatus for producing a halftone dot comprising a predetermined number of halftone dot sub-cells by making each sub-cell ($\omega_m l_n$) one of two colors, black or white, said apparatus comprising:
   (a) density obtaining means for obtaining a value ($C_{mn}$) representative of the density of each of a predetermined number of sections of an original corresponding to the predetermined number of halftone dot sub-cells by scanning the original;
   (b-1) comparing means being operable for making each halftone dot sub-cell ($\omega_m l_n$) one of said two colors, black or white, when the corresponding value ($C_{mn}$) is larger than a first reference value (Hi);
   (b-2) said comparing means further being operable for making each halftone dot sub-cell ($\omega_m l_n$) the other of said two colors, white or black, when the corresponding value ($C_{mn}$) is smaller than a second reference value (S);
   (b-3) if a value ($C_{mn}$) is between the first reference value (Hi) and the second reference value (S), said comparing means further being operable for determining whether the corresponding halftone dot sub-cell ($\omega_m l_n$) is to be black or white by comparing a value (Y) representative of the average density of said predetermined number of sections of said original with a predetermined reference value for the corresponding sub-cell ($\omega_m l_n$).

7. An apparatus for producing a halftone dot comprising a predetermined number of halftone dot sub-cells by making each sub-cell ($\omega_m l_n$) one of two colors, black or white, said apparatus comprising:
   (a) density obtaining means for obtaining a value ($C_{mn}$) representative of the density of each of a predetermined number of sections of an original corresponding to the predetermined number of halftone dot sub-cells by scanning the original;
   (b-1) determining means being operable for determining which of the halftone dot sub-cells should be one of said two colors, black or white, by comparing the values ($C_{mn}$) with corresponding predetermined halftone dot sub-cell reference values;
   (b-2) said determining means further being operable for determining which of the halftone dot sub-cells should be said one of said two colors, black or white, by comparing a value (Y) representative of the average density of said predetermined number of sections of said original with each of said halftone dot sub-cell reference values;
   (b-3) said determining means further being operable for comparing nunbers (d3) and (d4) of said halftone dot sub-cells which are determined to be said one of said two colors, black or white, as recited in (b-1) and (b-2), respectively;
   (b-4) if (d3) is not equal to (d4), said determining means further being operable for determining to be said one of said two colors, black or white, a halftone dot sub-cell determined as recited in (b-1) to be the other of said two colors, white or black, corresponding to one of said predetermined number of sections of said original having a value ($C_{mn}$) which is closest to its corresponding predetermined halftone dot sub-cell reference value or for determining to be the other of said two colors, white or black, a halftone dot sub-cell determined as recited in (b-1) to be said one of said two colors, black or white, corresponding to one of said predetermined number of sections of said original having a value ($C_{mn}$) which is closest to its corresponding predetermined halftone dot sub-cell reference value until (d3) is equal to (d4);
   (b-5) said determining means further being operable for latching a signal representing the color of each of said halftone dot sub-cells as determined in (b-1) to (b-4);
   (c-1) comparing means being operable for making each halftone dot sub-cell said one of said two colors, black or white, when the corresponding value ($C_{mn}$) is larger than a first reference value (Hi);
   (c-2) said comparing means further being operable for making each halftone dot sub-cell the other of said two colors, white or black, when the corresponding value ($C_{mn}$) is smaller than a second reference value (S);
   (c-3) if a value ($C_{mn}$) is between the first reference value (Hi) and the second reference value (S), said comparing means further being operable for making the corresponding halftone dot sub-cell one of said two colors, black or white, in accordance with the signal latched as recited in (b-5).

8. An apparatus as recited in claim 7, wherein said original contains picture images to be reproduced with halftone dots and binary density images such as text and line images and completely black and white areas, said apparatus further comprising:
   random-access memory (RAM) storage means for storing the locations on said original of said picture, text, and line images together with appropriate values of said first and second reference values (Hi) and (S) and appropriate values of first and second signals (a) and (b) for controlling recording of said picture, text, and line images, and for storing the locations on said original of said completely black and white areas with appropriate values of said first and second signals (a) and (b) for controlling recording of said completely black and white areas; and
   reading means for reading out said appropriate values of said first and second reference values (Hi) and (S) and said appropriate values of said first and second signals (a) and (b) from said random-access memory (RAM) storage means when a scanning head scanning said original reaches the corresponding locations on said original.

* * * * *